July 20, 1965 H. A. TOULMIN, JR 3,195,255

METHOD AND APPARATUS OF RECORDING AND DISPLAYING DATA

Filed May 11, 1961 4 Sheets-Sheet 1

INVENTOR.
HARRY A. TOULMIN JR.
BY Toulmin & Toulmin
ATTORNEYS

METHOD AND APPARATUS OF RECORDING AND DISPLAYING DATA

Filed May 11, 1961 4 Sheets-Sheet 2

INVENTOR.
HARRY A. TOULMIN JR.
BY Toulmin & Toulmin
ATTORNEYS

July 20, 1965 H. A. TOULMIN, JR 3,195,255

METHOD AND APPARATUS OF RECORDING AND DISPLAYING DATA

Filed May 11. 1961 4 Sheets-Sheet 3

INVENTOR.
HARRY A. TOULMIN JR.
BY Toulmin & Toulmin
ATTORNEYS

METHOD AND APPARATUS OF RECORDING AND DISPLAYING DATA

Filed May 11, 1961 4 Sheets-Sheet 4

INVENTOR.
HARRY A. TOULMIN JR.
BY Toulmin & Toulmin
ATTORNEYS

United States Patent Office 3,195,255

Patented July 20, 1965

3,195,255
METHOD AND APPARATUS OF RECORDING AND DISPLAYING DATA

Harry A. Toulmin, Jr., Dayton, Ohio, assignor to Basic Research Corporation, Dayton, Ohio, a corporation of Delaware Filed May 11, 1961, Ser. No. 109,289
2 Claims. (Cl. 40—124.1)

This invention relates to a solution of the problem of visually displaying complex technical data, bookkeeping data and other similar indicia including mathematical formulas, chemical formulas and electronic data according to the present invention, the data is so displayed and arranged that despite the complexity of the subject matter it is possible to present it in simple and clear form, with the essential facts and the essential data clearly brought out. The present invention makes it possible to bring all of the essentials for accomplishing this into one piece of mechanism which, by rotation of the mechanism, will be possible to quickly see all of the essential components of a problem whether it pertains to business, research, accounting, engineering or other data problem.

In connection with extremely complex data problems that are increasing in industry as well as in military and naval affairs, it is becoming increasingly necessary to be able to extract and display for quick reference, the fundamental essentials of any problem which can be expressed in writing or printing.

The construction of a device according to the present invention, its uses and methods of use are set forth as follows. One of the features of this invention is the ability to collapse the mechanism into a flat package for both transport and easy storage, while, at the same time, it will be readily available for expansion or demonstration either by looking directly at the data or by projecting the data upon a blackboard or screen.

The exact nature of the present invention and main objects and advantages of the present invention will be more apparent upon reference to the following specification taken in connection with the accompanying drawings in which.

Figures 7, 8, 9, 10, 11:
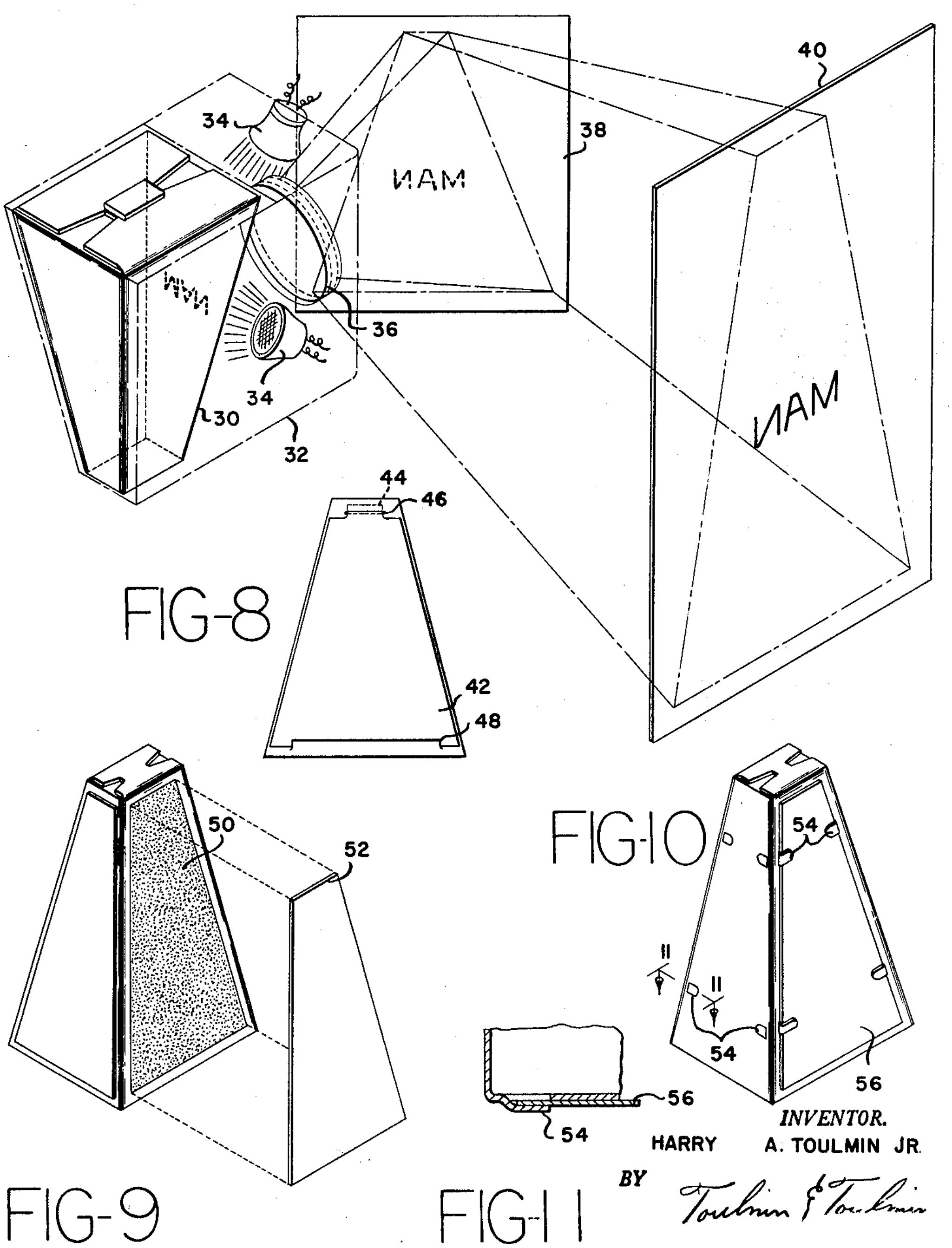
FIGURE 7 is a perspective view showing how the device could be set up so as to have the data on any face thereof projected on a screen for being viewed by a large audience.
Figure 7A:
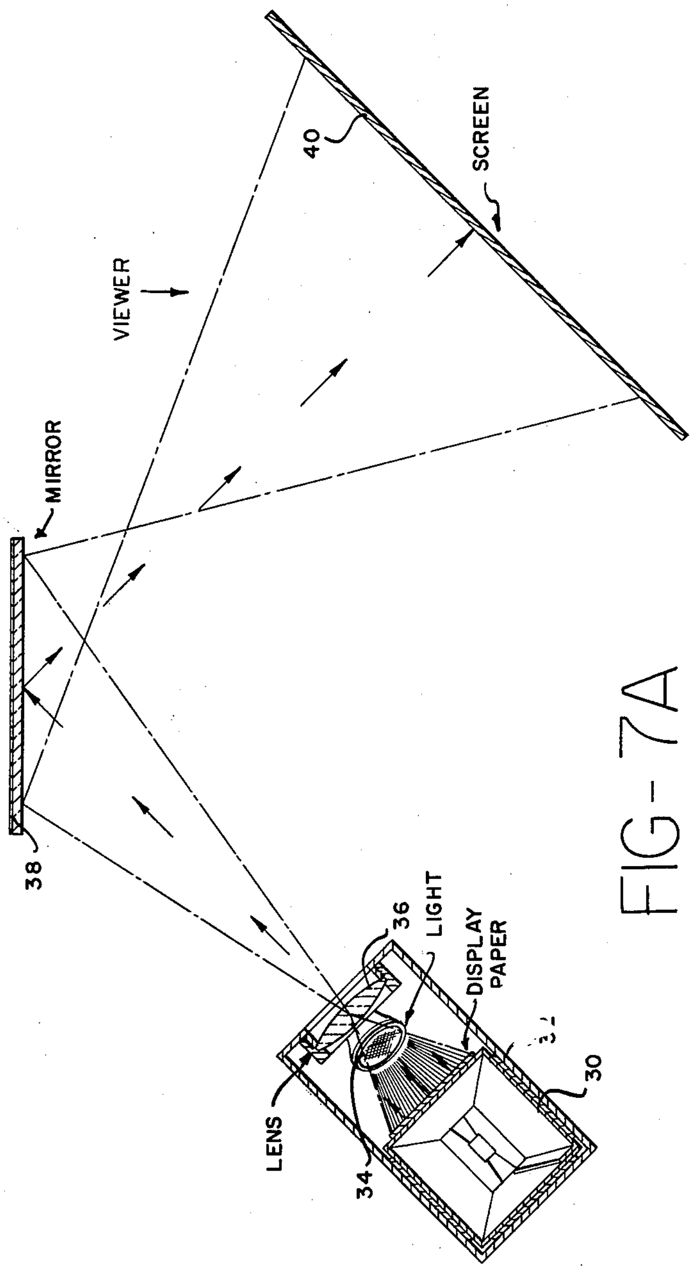
Figure 12:
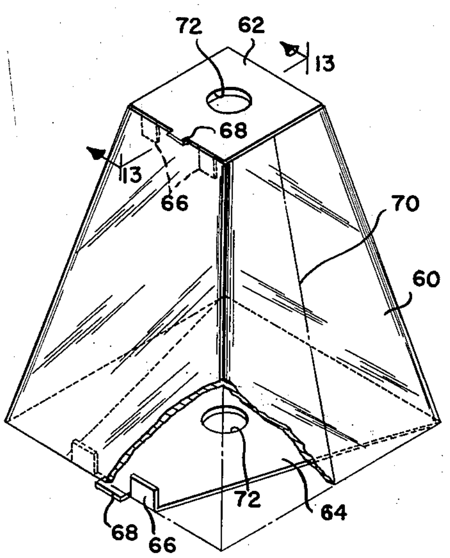
Figure 13:
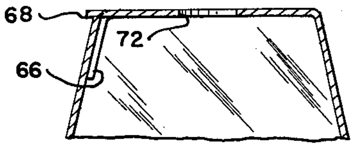
Figures 14, 15:
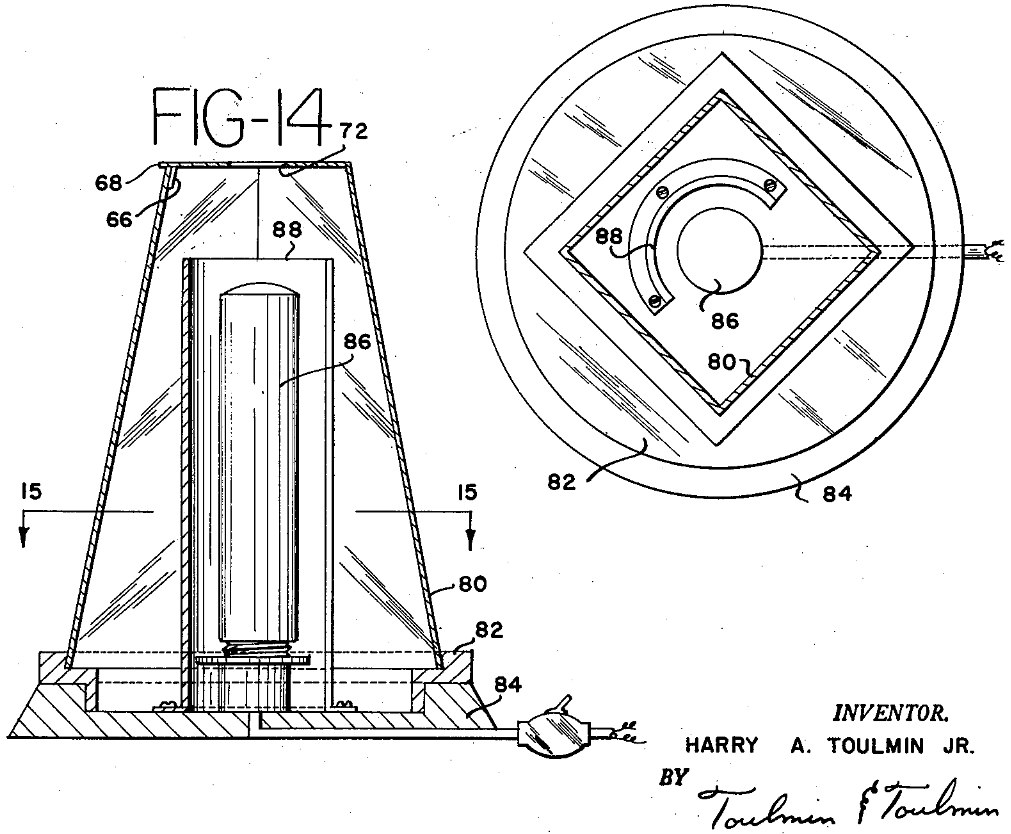

FIGURE 7*a* is a plan sectional view showing the construction of the FIGURE 7 modification;

FIGURE 8 is a view showing the manner in which the device could be adapted for receiving data sheets detachably;

FIGURE 9 is a perspective view showing the manner in which an adhesive, such as a pressure sensitive adhesive could be employed for retaining data sheets on the device;

FIGURE 10 is a perspective view showing an arrangement where tabs are formed on the device for supporting data sheets;

FIGURE 11 is a sectional view taken on line 11—11 of FIGURE 10;

FIGURE 12 is a perspective view showing a somewhat modified arrangement in which the hinge joints for the top and bottom flaps are eliminated;

FIGURE 13 is a sectional view indicated by line 13—13 on FIGURE 12;

FIGURE 14 is a vertical sectional view through a modification of the device wherein internal illumination is provided so that the data on the faces thereof will be more readily visible; and FIGURE 15 is a plan section taken on line 15—15 of FIGURE 14.

Referring to the drawings somewhat more in detail, there is shown in FIGURES 1 through 5 a device consisting substantially of a triangular pyramid formed of stiff paper or cardboard, or relatively thin plastic so as to be light, but stiff and self-supporting. The device comprises the trapezoidally shaped outer walls 10, 12, 14, and 16 and the upper and lower walls 18 and 20, respectively. The unit can be formed of a blank which has its edges joined as at 22 and with the top and bottom walls being made of halves that extend from the edges of the opposite walls 10 and 14 and which are connected together as by the hinge elements 24.

Figure 2:
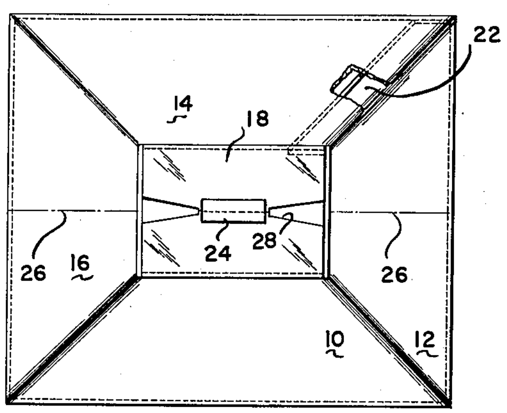
FIGURE 2 is a plan view thereof.
Figure 3:
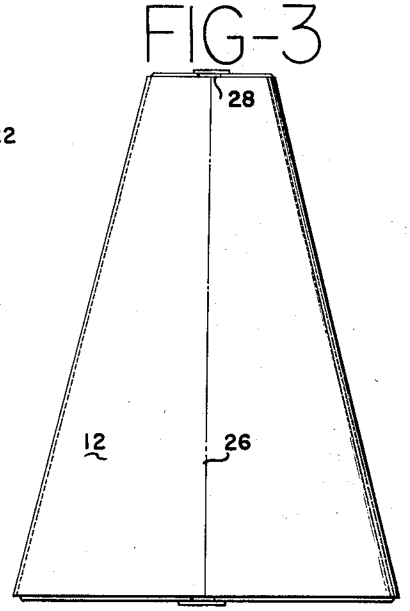
FIGURE 3 is a side view.
Figures 1, 5, 6:
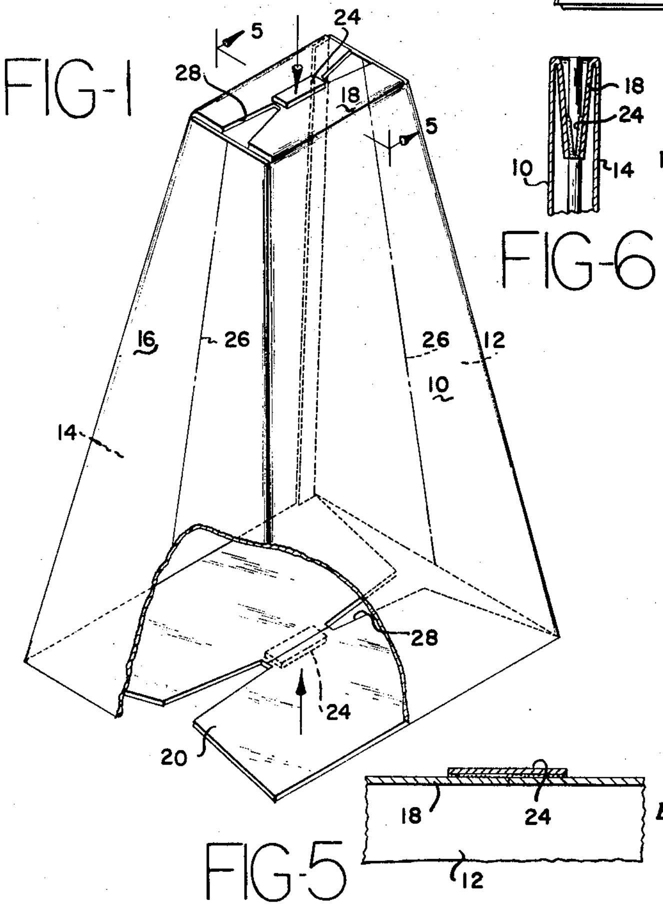
FIGURE 1 is a perspective view of one form which my invention can take.
FIGURE 5 is a section indicated by line 5—5 on FIGURE 1 showing a hinge joint forming a part of the device.
FIGURE 6 is a section taken on line 6—6 of FIGURE 4 showing the hinge joint of FIGURE 5 after it has been collapsed.
Figure 4:
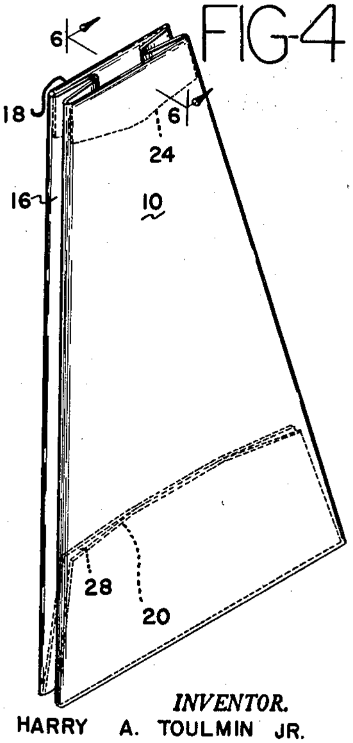
FIGURE 4 is a perspective view showing the device collapsed.

In the modification illustrated, the walls 10 and 14 are similar to each other but wider than the walls 12 and 16 and this permits ready collapsing of the unit by folding similar shaped walls 12 and 16 inwardly along the score lines 26 provided for this purpose. When collapsing the device, the top and bottom walls are folded inwardly also and the inwardly folded walls 12 and 16 are arranged to have their inner extending folded edges received in the notches 28 formed in the top and bottom walls. The device in folded condition is illustrated in perspective in FIGURE 4 with FIGURE 6 showing the manner in which the walls are folded inwardly so that the device can be collapsed flat. This permits the device to be readily stored in a brief case or to be carried in the pocket.

For use by individuals or small conferences, the modification described above is satisfactory but for larger groups, it might be desirable to project the data on any face of the device on a wall or a screen. Such an arrangement is illustrated in FIGURE 7 wherein the device according to this invention is indicated at 30 and it is placed within compartment 32 having a light source at 34 to illuminate the face of the device having data it is desired to observe.

The light reflects from the face of the device and passes through a lens 36 and is then reflected by a mirror 38 to a large screen or wall 40 which can be viewed and the data observed in its enlarged projection. This permits even large groups to take advantage of the compact data carrying device of the present invention.

FIGURES 8 through 11 show arrangements wherein the device according to this invention is arranged so that loose information sheets can be mounted thereon thereby permitting the data carried by the device to be replaced and revised if desired. In the first described modifications, the data could be printed, or applied to the walls of the device in any desired manner, but in the modifications of FIGURES 8 through 11, the information is recorded on separate paper sheets and then brought together with the supporting device.

In FIGURE 8, for example, the data sheet is indicated at 42 and it is adapted for being mounted on the device by having a tab 44 at the upper end thereof which extends into a slot 46 provided in the wall of the device. The lower edge of the data sheet 42 is adapted for being inserted behind a tab 48 formed on the wall of the supporting device.

In FIGURE 9, I show how the wall could be coated with a pressure ensitive adhesive 50 so that the data sheet 52 could be pressed against the wall and readily be retained thereon. This view will also serve to illustrate that the device could be made of a transparent, or translucent plastic material with the stippled area at 50 representing a frosted or defused surface so that upon mounting a data sheet thereon and internally illuminating the device, the information on the sheet would be readily readable.

FIGURES 10 and 11 show how the device on each wall could be provided with a plurality of tabs 54 to engage over the edges of a loose data sheet 56 for releasably retaining the data sheet on the device.

FIGURES 12 and 13 show the manner in which the device could be made so that all the side walls are of the same width and also how the hinge joints in the top and bottom walls could be eliminated. In these figures, the side walls, indicated at 60, are all of the same width and each of the top and bottom walls 62 and 64, respectively, are provided with a pair of tabs 66 attached for engaging the inside of the wall 60 opposite to the side wall to which the top and bottom walls are hinged. Each of the top and bottom walls also comprises a short tab 68 for engaging the end edge of the side wall behind which the tabs 66 are disposed. The top and bottom walls can now readily be collapsed into the inside of the device by releasing them from their engagement with the one wall and hinging them inwardly into the inside of the device whereupon the side walls adjacent the side wall to which the top and bottom walls are hingedly connected can be folded inwardly along their score lines 70. The finger holes 72 provided in the top and bottom walls facilitate in the set up and the collapsing of the device.

An internally illuminated modification of the device is illustrated in FIGURES 14 and 15 and in this modification, the device has no bottom wall but has its side walls 80 arranged for being received in a rotatable support member 82 rotatable on a base 84 which base has means for carrying a light bulb 86. This light bulb has associated therewith a reflector 88 so that any selected wall of the device can be strongly illuminated from the inside depending on the position to which support member 82 is rotated.

The device of FIGURES 14 and 15 could be employed as illustrated for small groups, or for an individual, or it could be employed in connection with a projecting arrangement such as is illustrated in FIGURE 7 for providing a relatively large image to be viewed by a large group.

The device according to this invention is inexpensive and is easy to carry about, being light and collapsible, and permits the display of a great deal of data.

It will be understood that this invention is susceptible to modification in order to adapt it to different usages and conditions; and, accordingly, it is desired to comprehend such modifications within this invention as may fall within the scope of the appended claims.

I claim:

1. A collapsible data display device comprising: four similar trapezoidal side walls hingedly interconnected at their adjacent edges to form a device of frusto-pyramidal shape, said side walls having means adapted to secure a data sheet thereto, a rectangular top wall for the device hingedly connected along only two of its opposed edges to the top edge of two opposed side walls, a rectangular bottom wall similarly attached to the bottom edge of said two opposed side walls, said other two opposed side walls having medial fold lines extending from top to bottom thereof and lying in a given plane, said top and bottom walls also having fold lines lying in said plane, and said top and bottom walls each having opposed notches extending inwardly toward their respective hinge lines, said notches being bisected by said plane, said side walls having the medial fold lines therein and said top and bottom walls being adapted to be collapsed inwardly along the pertaining said medial fold lines to collapse said device with said side walls having the medial fold lines therein being received in said notch means.

2. The display device as defined in claim 1, where the means for securing a data sheet to the side wall comprises tabs struck out from the wall.

References Cited by the Examiner

UNITED STATES PATENTS

| | | | |
|---|---|---|---|
| 1,059,371 | 4/13 | Kelley | 40—132 |
| 1,499,927 | 7/24 | Hurst | 40—126 |
| 1,866,170 | 7/32 | O'Neill | 88—240 |
| 2,189,577 | 2/40 | Conrad | 88—240 |
| 2,209,668 | 7/40 | Thornton | 40—159 |
| 2,264,965 | 12/41 | Broderick | 40—133 |
| 2,351,166 | 6/44 | Vergobbi | 239—37 |
| 2,407,952 | 9/46 | Wather | 40—124.1 |
| 2,553,804 | 5/51 | Zinn | 229—37 |
| 2,794,116 | 5/57 | Morin | 40—152.2 |
| 3,069,062 | 12/62 | Keith | 229—37 |
| 3,084,844 | 4/63 | Rattner | 229—22 |

FOREIGN PATENTS

| | | |
|---|---|---|
| 563,691 | 10/23 | France. |

EUGENE R. CAPOZIO, *Primary Examiner.*

ERIC A. ANDERSON, EDWARD V. BENHAN, JEROME SCHNALL, *Examiners.*